(12) United States Patent
Von Hippel et al.

(10) Patent No.: US 11,842,669 B1
(45) Date of Patent: Dec. 12, 2023

(54) INDEPENDENT REFRESH RATE FOR MULTIPLE MONITORS

(71) Applicant: Microsoft Technology Licensing, LLC, Redmond, WA (US)

(72) Inventors: Michael Paul Erich Von Hippel, Seattle, WA (US); Reiner Fink, Mercer Island, WA (US); Leonardo Esteban Blanco, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/855,755

(22) Filed: Jun. 30, 2022

(51) Int. Cl.
G09G 3/20 (2006.01)
G06F 3/14 (2006.01)

(52) U.S. Cl.
CPC .......... G09G 3/2092 (2013.01); G06F 3/1423 (2013.01); *G09G 2340/0435* (2013.01)

(58) Field of Classification Search
CPC .......... G09G 2340/0435; G06F 3/1423; G06F 3/1431; G06F 3/1446
See application file for complete search history.

(56) References Cited

U.S. PATENT DOCUMENTS

| | | | | |
|---|---|---|---|---|
| 7,168,048 | B1 * | 1/2007 | Goossen | G09G 5/42 715/796 |
| 10,460,643 | B2 * | 10/2019 | Peng | G06F 1/3265 |
| 10,565,924 | B2 * | 2/2020 | Peng | G06F 1/3203 |
| 11,574,576 | B1 * | 2/2023 | Von Hippel | G09G 5/363 |
| 2006/0010269 | A1 * | 1/2006 | Leibbrandt | H04N 9/8227 375/E7.091 |
| 2008/0150920 | A1 * | 6/2008 | Yen | G06F 3/1438 345/522 |
| 2018/0260184 | A1 * | 9/2018 | Hardacker | G09G 5/005 |
| 2018/0261145 | A1 * | 9/2018 | Peng | G06F 1/3203 |
| 2018/0349151 | A1 * | 12/2018 | Hagedorn | G06F 9/4881 |
| 2020/0036933 | A1 * | 1/2020 | Lee | H04N 21/478 |
| 2021/0201731 | A1 | 7/2021 | Ranjan et al. | |
| 2022/0051630 | A1 * | 2/2022 | Shen | G09G 3/3291 |
| 2022/0084481 | A1 * | 3/2022 | Manepalli | G09G 5/001 |

FOREIGN PATENT DOCUMENTS

WO 2010144096 A1 12/2010

OTHER PUBLICATIONS

Whitson Gordon, How to Set Up Nvidia G-Sync for Smooth, Tear-Free PC Gaming, Mar. 8, 2021, https://www.pcmag.com/how-to/how-to-set-up-nvidia-g-sync-for-smooth-tear-free-pc-gaming (Year: 2021).*

(Continued)

*Primary Examiner* — Patrick F Marinelli
(74) *Attorney, Agent, or Firm* — Barta, Jones & Foley, PLLC

(57) ABSTRACT

Independent refresh rates may be enabled for multiple monitors. Any displays that are presenting content in a full screen mode are refreshed at a rate set by the application presenting the content. All other devices are refreshed at a rate that is determined by a window manager based on various factors including the type of application(s) executing, the size of the applications presenting content, the location of the applications presenting content, hardware configurations, and so forth.

20 Claims, 10 Drawing Sheets

(56) References Cited

OTHER PUBLICATIONS

Tim Schiesser, Using FreeSync with Nvidia GPUs Examined, Jan. 16, 2019, https://www.techspot.com/article/1779-freesync-and-nvidia-geforce/ (Year: 2019).*

Imgur, 144Hz has disappeared from my refresh rates in nvidia contorl panel. Help!, Jul. 19, 2018, https://imgur.com/GkBFZIB (Year: 2018).*

Rob Shaffer, What is G-Sync and What Does It Do? Jun. 30, 2022, https://www.displayninja.com/what-is-g-sync/ (Year: 2022).*

Nvidia, I own an Adaptive-Sync monitor that is not on your G-SYNC Compatible list. Can I enabled variable refresh rate anyways?, Sep. 29, 2021, https://nvidia.custhelp.com/app/answers/detail/a_id/4768/~/ i-own-an-adaptive-sync-monitor-that-is-not-on-your-g-sync-compatible-list.-can (Year: 2021).*

"Application as Filed in U.S. Appl. No. 17/738,876", filed May 6, 2022, 61 Pages.

"Does High FPS make you a better gamer? Ft. Shroud", Retrieved from: https://www.youtube.com/watch?v=OX31kZbAXSA, Nov. 22, 2019, 5 Pages.

Mehrotra, Anmol, "Microsoft finally fixes multi-monitor stutter problem in Windows 10 20H1", Retrieved from: https://mspoweruser.com/microsoft-finally-fixes-multi-monitor-stutter-problem-in-windows-10-20h1/, Feb. 18, 2020, 17 Pages.

"Present(_:atTime:)", Retrieved from: https://web.archive.org/web/20220208155620/https://developer.apple.com/documentation/metal/mtlcommandbuffer/1442989-present, Feb. 8, 2022, 2 Pages.

"144hz now possible on ChromeOS—here's how to make ChromeOS smoother than the iPad Pro", Retrieved from: https://www.reddit.com/r/chromeos/comments/coovou/144hz_now_possible_on_chromeos_heres_how_to_make/, Aug. 11, 2019, 12 pages.

Hoe, Nyau Wai , "Game Stuttering and Lag on Dual Monitor when opening Twitch or Youtube", Retrieved from: https://www.windowsdigitals.com/game-stuttering-lag-dual-monitor/, Mar. 7, 2022, 20 Pages.

Ginny, et al., "Dynamic Refresh Rate Partitioning Scheme for Multiwindow Screen Sharing Applications", In Proceedings of 4th International Conference on Recent Advances in Information Technology, Mar. 15, 2018, pp. 1-6.

"International Search Report and Written Opinion Issued in PCT Application No. PCT/US23/022479", dated Sep. 12, 2023, 18 Pages.

* cited by examiner

INDEPENDENT REFRESH RATE FOR MULTIPLE MONITORS

BACKGROUND

Some modern electronic computing devices include or are connected to multiple display devices, such as a display screen, some of which are capable of executing at high-frequency refresh rates and/or dynamically switching between higher and lower refresh rates depending on the application presented on the screen. Under conventional techniques, a primary monitor is typically determined and each other monitor is refreshed at the refresh rate of the primary monitor. The refresh rate of the primary monitor may change depending on the type of content presented on the primary monitor, which in turn changes the frame rate of content displayed on each monitor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to systems and methods that refresh different monitors at independent refresh rates. For example, the method comprises identifying at least a first display device and a second display device, identifying at least a first application presenting first content on the identified first display device and at least a second application presenting second content on the identified second display device, determining whether either of the first application or the second application is presenting the first content or the second content, respectively, in full screen mode, in response to determining the first application is presenting the first content in full screen mode, retrieving a refresh rate for the first display device based on an optimal refresh rate for the first application, determining a refresh rate for the second display device, and refreshing the first content on the first display device at the refresh rate for the first display device and the second content on the second display device at the refresh rate for the second display device.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
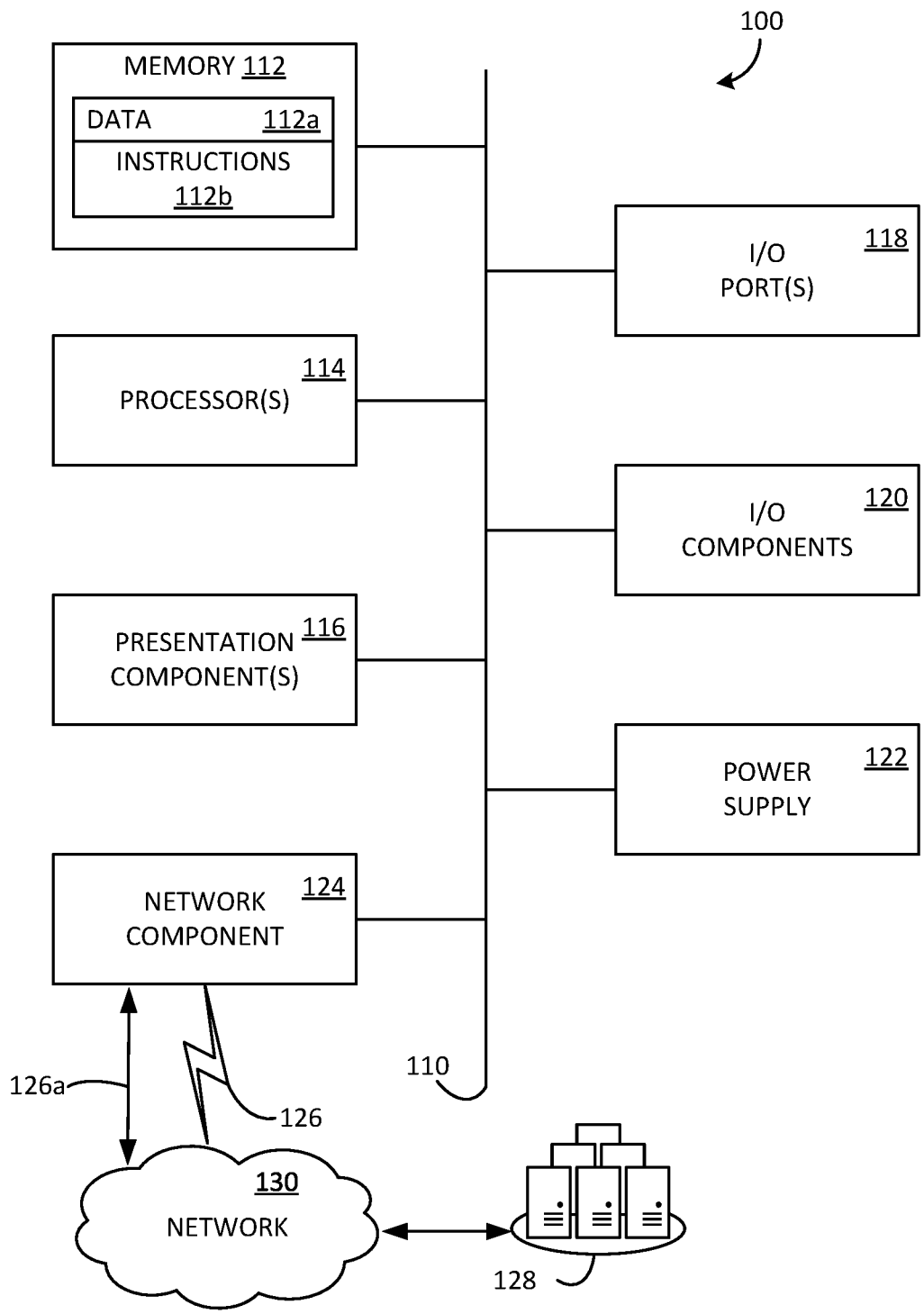
FIG. 1 is a block diagram illustrating an example computing device for implementing various examples of the present disclosure.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Multiple displays, such as two or more monitors, may be implemented in order to present more content than may be able to be presented on a single display. For example, a laptop computer may be connected to one or more additional monitors that present content instead of or in addition to only presenting the content on the display of the laptop computer. As another example, a desktop computer may be connected to at least one but often times two or more monitors that present content. These scenarios are common with gaming applications, where a user executes a gaming application while a video stream plays or is previewed on another monitor; dynamic refresh rate applications, where a user inks or scrolls on a high refresh rate laptop while docked with an external display as the primary display; in an office environment where content from a first device is cast to a second device that has a lower refresh rate; and where a user edits high frames per second (FPS) content and has a large amount of interactions with media content. In each of these scenarios, a high and/or variable refresh rate is desirable in order to provide a preferred user experience, but the high and/or variable refresh rate for the monitor presenting this type of content may not provide an optimal experience for content presented on another monitor.

For example, in some scenarios, each of the monitors may include different hardware, have different configuration settings, present different types of content, and so forth such that one monitor may be able to refresh at a higher maximum refresh rate than one or more of the other monitors. In addition, one or more monitors may enable variable refresh rates, which are desirable because of their ability to match their refresh rate to the frame rate of presented content, such as gaming content, that derives a significant benefit from higher refresh rates. Variable refresh rates may, however, refresh at a lower refresh rate when the benefit of the higher refresh rate is outweighed by the additional processing power and/or battery consumption required. Whether the content is a game, media, or another type of content, the ability to match the frame rate of the content is highly desirable, as are the power savings and performance of dynamic refresh rate. Thus, the user experience typically degrades when one or more monitors consistently refresh at a high frame rate in a system.

To address these challenges, conventional solutions identify one monitor as the primary monitor, either automatically by the operating system or manually through user selection.

In these scenarios, the frame rate of content presented on any monitor is timed based on the refresh rate of the primary monitor. While each monitor still has its own refresh rate, content may not be well timed to the refresh rate of the monitor itself. Thus, the conventional solutions are bound by an operating system's dependence on a primary monitor to set a refresh rate and any secondary monitors match the refresh rate of the primary monitor. However, these solutions present multiple challenges of their own. For example, the primary monitor may present a gaming application at a variable refresh rate as the frames of the game change, while the secondary monitor may present a video application that performs most optimally at a constant, lower refresh rate that matches the cadence of the video frames. The variable refresh rate may cause the video application to be presented in a manner that is distracting and not smooth. As another example, the primary monitor may present the video application while the secondary monitor may present the gaming application. In this scenario, the gaming application is unable to present the benefits of the variable refresh rate, as the primary monitor uses the constant, lower refresh rate for optimal performance of the video application.

The present application addresses these and other deficiencies by providing independent refresh rates for multiple monitors. In some examples, an application is identified that is enabled to control the refresh rate for an entire, single monitor, independent of refresh rates for any additional monitors. In other examples, an optimal or preferred refresh rate may be determined for all monitors that refresh at an independent refresh rate based on a variety of factors including the types of applications rendering content on the monitors, a size of the applications rendered on the displays, the locations on the display of the applications rendered on the display, whether an application is presented in front of or behind another application, hardware capabilities of the particular displays, graphics processing unit (GPU) processing capabilities, and so forth.

As referenced herein, a refresh rate of a display, such as a monitor, is the number of times per second that the content is refreshed on the display. For example, a display refreshing at 60 Hz will be updated sixty times per second, a display refreshing at 120 Hz will be updated at 120 times per second, and so forth. The refresh rate determines how smoothly motion appears on the display. For example, where the content on the display is a gaming application that includes fast-moving action, a higher refresh rate may improve the overall gaming experience of the user by better keeping up with the action. A higher refresh rate may also improve the user experience by implementing smoother motion when browsing the web or using a digital pen to write or draw on the display.

As referenced herein, the terms lower refresh rate and higher refresh rate should be understood to be relative terms. For example, a lower refresh rate may refer to a refresh rate of 60 Hz and a higher refresh rate may refer to a refresh rate of 120 Hz. 60 Hz is a lower refresh rate than 120 Hz, and 120 Hz is a higher refresh rate than 60 Hz. However, the specific refresh rates of 60 Hz and 120 Hz are provided as examples only and should not be construed as limiting. The lower refresh rate may be higher or lower than 60 Hz and the higher refresh rate may be higher or lower than 120 Hz without departing from the scope of the present disclosure. Various refresh rates may be described herein as 24 Hz, 30 Hz, 60 Hz, 120 Hz, 144 Hz, and so forth, although each of these examples is presented for illustration only.

As referenced herein, a swap chain is a collection of buffers that are used for displaying frames on a display, such as a monitor. A swap chain may be associated with a particular application, an operating system, a graphics infrastructure, and so forth. By using a swap chain, an application may time when its content will be presented on the display. Previous solutions would specify a number of frames to be sustained on the display and then request a custom frame rate from the system. The swap chain(s) described herein additionally specify a timing at which a frame should be rendered on the display with the request for a custom frame rate.

When an application pushes, or provides, a new frame to be presented on the display, the first buffer in a swap chain takes the place of the displayed buffer. This may be referred to herein as swapping or flipping. The present disclosure contemplates various types of flipping, which enable different ways to update frames on a display, based on different types of swap chains. For example, the present disclosure describes an independent flip (iFlip) process and a direct flip (dFlip) process. For example, in a dFlip process, the swap chain of a particular application is used to present content on a display, instead of the swap chain of the operating system. Direct flip may also be taken a step further to the iFlip process, where application frames are sent directly to the display without an intermediary.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, virtual machines (VMs), mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif, ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

As described herein, the computing device 100 may be implemented as one or more servers. The computing device 100 may be implemented as a system 200 or in the system 200 as described in greater detail below.

Figure 2:
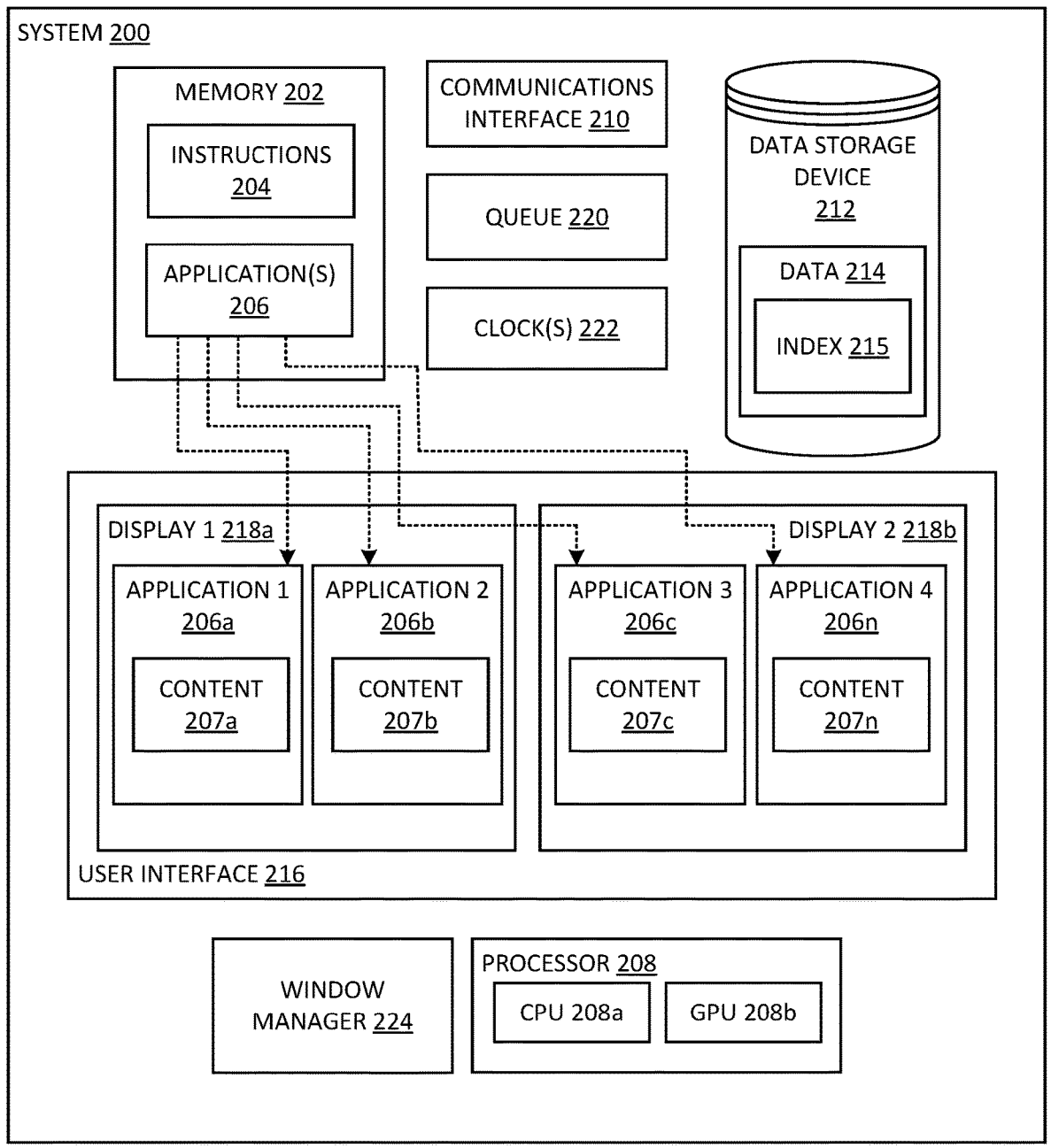
FIG. 2 is a block diagram illustrating an example system for implementing various examples of the present disclosure.

FIG. 2 is a block diagram illustrating an example system for implementing various examples of the present disclosure. The system 200 may include the computing device 100. In some implementations, the system 200 includes a cloud-implemented server that includes each of the components of the system 200 described herein. In some implementations, the system 200 is presented as a single computing device that contains each of the components of the system 200. For example, the system 200 may include a laptop computer containing each of the components described herein. In other implementations, the system 200 includes multiple devices. For example, the system 200 may include a computer connected to one or more monitors utilized as the user interface 216.

The system 200 includes a memory 202, a processor 208, a communications interface 210, a data storage device 212, a user interface 216, and a window manager 224. The memory 202 stores instructions 204 executed by the processor 208 to control the communications interface 210, the user interface 216, and the window manager 224. The memory 202 further stores data, such as one or more applications 206. An application 206 is a program designed to carry out a specific task on the system 200. For example, the applications 206 may include, but are not limited to, drawing applications, paint applications, web browser applications, messaging applications, navigation/mapping applications, word processing applications, gaming applications, video applications, an application store, applications included in a suite of productivity applications such as calendar applications, instant messaging applications, document storage applications, video and/or audio call applications, and so forth, and specialized applications for a particular system 200. The applications 206 may communicate with counterpart applications or services, such as web services. In an example, the applications 206 represent downloaded client-side applications that correspond to server-side services executing in a cloud.

The processor 208 executes the instructions 204 stored on the memory 202 to execute various functions of the system 200. For example, the processor 208 controls the communications interface 210 to transmit and receive various signals and data, controls the data storage device 212 to store data 214, controls the user interface 216 to display one or more client-side versions of the applications 206, and controls the window manager 224 to select a refresh rate for each monitor.

In some implementations, the processor 208 includes a central processing unit (CPU) 208a and a graphic processing unit (GPU) 208b. The CPU 208a is a processing unit that executes processing tasks of the system 200, including tasks of the window manager 224, described in greater detail below. The GPU 208b is a processing unit that executes processing tasks related to graphics processing. Each of the CPU 208a and the GPU 208b may include one or more cores which provide the processing power of the CPU 208a and GPU 208b, respectively. In some implementations, the CPU 208a includes a CPU timer and/or the GPU 208b includes a GPU 208b timer that may be originally sourced from a display 218. A signal of the GPU 208b timer may be relayed through the GPU 208b.

In some implementations, the processor 208 receives and logs requests from one or more of the applications 206 and/or the operating system of the system 200. For example, instructions for the operating system may be included within the instructions 204. The instructions 204 may, in some examples, manage the refresh rate, including identifying whether any applications 206 may control the refresh rate of a display 218 independently of the window manager 224, as described in greater detail below, and determining an optimal or preferred refresh rate the display or displays 218 controlled by the window manager 224.

The data storage device 212 stores data 214. The data 214 may include any data, including data related to the applications 206 executing on the user interface 216, configuration data of each display 218 that presents the user interface 216, optimal or preferred refresh rates for each application 206, and so forth. In some examples, the data 214 may include an index 215 that includes an optimal or preferred refresh rate and type of refresh rate for each application 206 in the system 200 that may execute on one or more of the displays 218. For example, the index 215 may include data that the optimal or preferred refresh rate for a video application 206 is a constant refresh rate of 24 Hz, the optimal or preferred refresh rate for a gaming application 206 is a variable refresh rate of 144 Hz, and so forth.

In some implementations, the system 200 includes a queue 220. In some implementations, the queue 220 is stored on the memory 202. In other implementations, the queue 220 is stored on the data storage device 212. The queue 220 stores a next frame or frames to be sent to a particular application 206 to be rendered as content 207.

Content 207 of a particular application 206 is rendered on the user interface 216 as a sequence of frames. For example, where the application 206 is a video application, the content 207 is presented as a sequence of frames, each depicting an image but when refreshed at a refresh rate, such as 24 Hz for a video application, presents an animation. Video content is filmed at a constant, predictable cadence and therefore optimally presented at a constant refresh rate that matches, or is a positive integer multiple of, the cadence at which the video was filmed. As another example, content 207 of a gaming application is also presented as a sequence of frames, but is optimally presented at a variable high refresh rate due to some frames needing a greater time to render than others, the application 206 presenting the content 207 based on inputs, such as panning or scrolling, from the user rather than the predictable frames of video, and so forth. Thus, varying the refresh rate of the next frame is particularly beneficial for gaming applications, inking applications, and other applications that present content in real-time based on user inputs. The rendering of frames, including the timing for rendering the frames, is discussed in greater detail with regards to the description of FIGS. 5A-6B.

In some implementations, the system 200 includes a clock 222. The clock 222 may be a presentation, or composition, clock that controls timing information for frames of the applications 206 presented on the user interface 216. For example, each application 206 may call the clock 222 to identify a time at which the application 206 should wake to receive a new vblank in order to refresh the content presented on the user interface 216. In some implementations, the clock 222 may include a different clock for each application 206, each clock maintaining a different refresh rate. As referenced herein, a vblank is pulse, or signal, sent to each executing application 206 at a specified frequency to indicate a new frame. Timing information for the vblank(s) sent to an application 206 is controlled by the clock 222, such as a presentation clock or a compositor clock. Each application 206 uses the clock 222 to map when to wake to receive a next vblank indicating to refresh the content the application presents.

In some implementations, the composition clock 222 is a signal sent to an application 206 that, when received by the application 206, indicates to the application 206 to wake and draw content to align with when the system 200 composes the content. The composition clock 222 may be sent at a refresh rate that is linked to a refresh rate defined by an operating system of the system 200. The applications 206 may observe this rate or choose to operate independently of this rate. For example, when an application 206 chooses to operate independently of this, it may set a custom refresh rate for a particular monitor. In this example, the compositor clock may retrieve the refresh rate from the display 218, of the selected displays, which has with the next-highest refresh rate to ensure that slower content (e.g., movies, games) doesn't affect the smoothness of the rest of the content onscreen. Further, in examples where multiple monitors support a variable refresh rate, the monitors may be driven in the variable refresh rate mode so that their updates are synchronized.

In examples where a swap chain is implemented, the swap chain is presented directly to the display 218 by the flip process without copying the composition clock 222. In this example, the composition clock 222 then is able to enable a custom refresh rate. Thus, by implementing an independent refresh rate as described herein, the window manager 224 may recognize when some content would benefit from a specific frame rate and through implementing a flip model (e.g., iFlip, dFlip) grant an application 206 on a display 218 a custom refresh rate. Thus, because the swap chain for the application 206 may flip independently, i.e., render its content independently of the window manager 224, the window manager 224 may source a composition clock 222 from another source, such as a display 218.

In some implementations, the clock 222 is provided to each of the applications 206 via an application programming interface (API) called by each of the applications 206. The clock 222, such as the compositor clock API, provides statistics and frame rate control for applications 206 to present on-screen content 207 and may be implemented on a variety of hardware configurations. In some implementations, an API may provide a callback interface such as CompositorClock::WaitforVblank. In another implementation, such as a raster scan, the clock 222 implements an API such as IDXGIOutput::WaitForVBlank, where a thread is halted until the next vblank occurs. In this example, the vblank occurs when the raster moves from the lower right corner to the upper left corner to begin drawing a next frame.

The window manager 224 is implemented on the at least one processor 208 and renders content, such as the content 207, on the user interface 216. The window manager 224 may present the content 207 on one or more displays 218, such as on one or both of the first display 218a and the second display 218b. The window manager 224 renders the content 207 at the refresh rate at which each display is refreshing. In some examples, the first display 218a and the second display 218b may be refreshing at the same refresh rate. However, the first display 218a and the second display 218b may not be synchronized through a variable refresh rate. Where the first display 218a and the second display 218b are not synchronized, even though they may be refreshing at the same refresh rate, the first display 218a and the second display 218b are likely to be slightly different in terms of either frequency (e.g., in several decimal places) or in terms of the phase of the signal. In other examples, the first display 218a and the second display 218b may refresh at different refresh rates, for example where at least one of the first display 218a and the second display 218b is determined to be able to refresh independently of a rate set by the window manager 224. In other examples, only one of the first display 218a and the second display 218b may be presenting content at a time. For example, only one of the first display 218a and the second display 218b may be turned on or only one of the first display 218a and the second display 218b may be actively presenting content 207.

In some examples, the window manager 224 generates, or compiles, the index 215 and determines the optimal or preferred refresh rate for a particular display based on prioritizing a particular application 206 presently executing on one of the displays 218 and selecting the refresh rate of the prioritized application 206 from the index 215. As described herein, a particular application 206 may be prioritized based on one or more factors including, but not limited to, a size of the applications 206 rendered on the display(s) 218, the types of the applications 206 rendered on the display(s) 218 (e.g., a video application, a gaming application, a word processing application, a web browser application, and so forth), the locations on the display 218 of the applications 206 rendered on the display 218, whether an application 206 is presented in front of or behind another application 206, hardware capabilities of the particular display 218, GPU processing capabilities, and so forth.

The user interface 216 may be rendered by the window manager 224 and presents content 207 related to one or more applications 206. The user interface 216 may be presented on one or more displays 218, for example one or both of the first display 218a and the second display 218b, each of which may present one or more applications 206 at a time. Each display, or monitor, 218 may be an in plane switching (IPS) liquid-crystal display (LCD), an LCD without IPS, an organic light-emitting diode (OLED) screen, or any other suitable type of display. In some implementations, the display 218 includes a touch screen such that the user interface 216 may directly receive an input, such as from a stylus or from the finger of a user of the system 200. Various interactions with the system 200 may be presented on the display 218, such as panning, scrolling, zooming in, zooming out, inking, and so forth. As referenced herein, inking refers to the process of interacting with an application 206 by contacting the display 218, such as with a stylus or the finger of a user. For example, the application 206 may be a paint or drawing application where the user draws on the user interface 216. The markings made on the display 218 may appear on the user interface 216 as content presented by the application 206.

In some implementations, the display 218 includes a single display, such as a single monitor. In other implementations, the display 218 includes multiple displays, such as more than one monitor. Where the display 218 includes multiple displays, the displays may be extended such that different content may be displayed on each display, duplicated such that the same content is displayed on each display, or content may be displayed on only one of the displays. Although the display 218 presenting the user interface 216 is shown in FIG. 2 as implemented on the system 200, various examples are possible. For example, the display 218 may include one or more monitors connected to the system 200 via wired or wireless methods. Examples of wired methods include a high-definition multimedia interface (HDMI) cable, a universal serial bus (USB) cable such as a USB-C cable, a digital visual interface (DVI) cable, or any other suitable cable for connecting a monitor to the system 200. Examples of wireless methods include Bluetooth™ connection, a wireless internet connection such as Wi-Fi™, or any other suitable method.

Each application 206 displays content 207 corresponding to the application 206 on the user interface 216 presented on the display 218. For example, as shown in FIG. 2, on the first display 218a, the first application 206a displays content 207a and the second application 206b displays content 207b, and on the second display 218b, the third application 206c displays content 207c and the fourth application 206n displays content 207n. However, this example is presented for illustration only and should not be construed as limiting. The user interface 216 may display any number of applications 206 on any number of displays 218 without departing from the scope of the present disclosure. For example, the user interface 216 may display one application 206, two applications 206, or more than two applications 206 at a time on one display 218, two displays 218, or more than two displays 218.

Figure 3A:
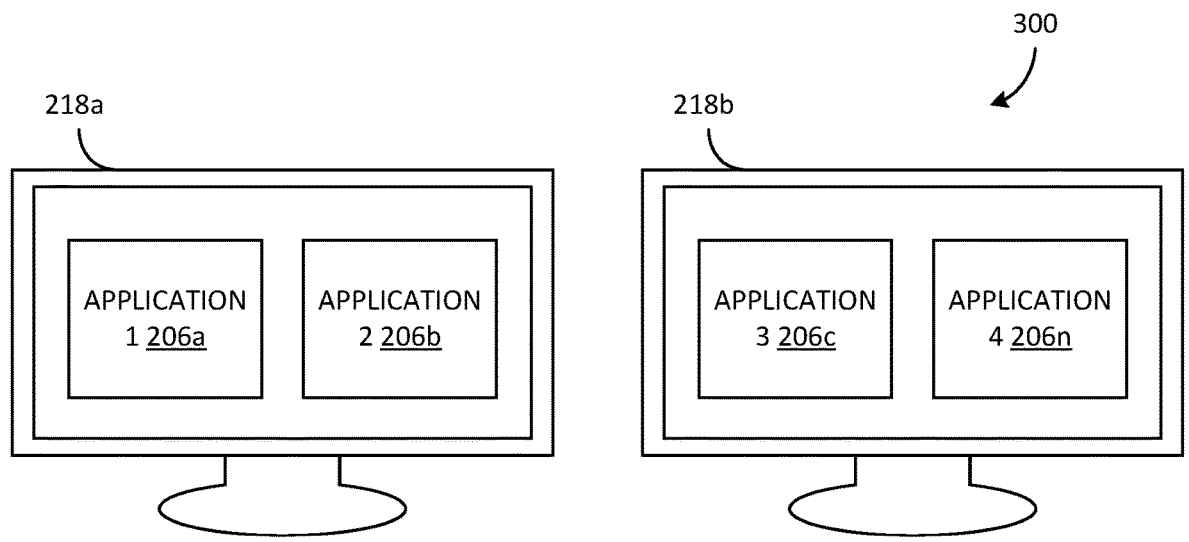
FIGS. 3A-3C illustrate multiple displays each presenting one or more applications according to various examples of the present disclosure.

Further, multiple applications 206 may be displayed in various configurations. For example, FIG. 3A illustrates a first view 300 that includes the first display 218a and the second display 218b. The first view 300 illustrates the first application 206a and the second application 206b presented on the first display 218a and the third application 206c and the fourth application 206n presented on the second display 218b. As shown in the first view 300, the first application 206a and the second application 206b are presented side by side and approximately the same in size, such that the number of pixels required on the first display 218a to present each of the first application 206a and the second application 206b is approximately the same. Similarly, the third application 206c and the fourth application 206n are presented side by side and approximately the same in size, such that the number of pixels required on the second display 218b to present each of the third application 206c and the fourth application 206n is approximately the same.

Figure 3B:
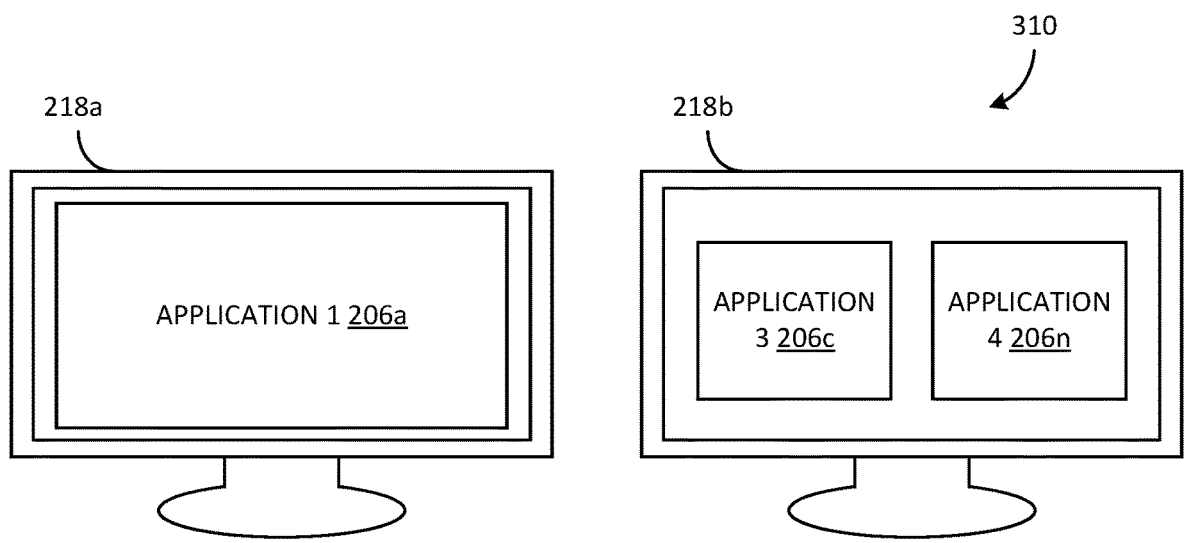

FIG. 3B illustrates a second view 310 that includes the first display 218a and the second display 218b. The second view 310 illustrates the first application 206a presented on the first display 218a in full screen mode, such that the second application 206b is not presented at all on the first display 218a. In some examples, the second application 206b is executing in the background but not presented, or displayed, on the first display 218a. In other examples, the second application 206b may not be executing at all. The third application 206c and the fourth application 206n are presented on the second display 218b as in the first view 300, where the third application 206c and the fourth application 206n are presented side by side and approximately the same in size, such that the number of pixels required on the second display 218b to present each of the third application 206c and the fourth application 206n is approximately the same.

Figure 3C:
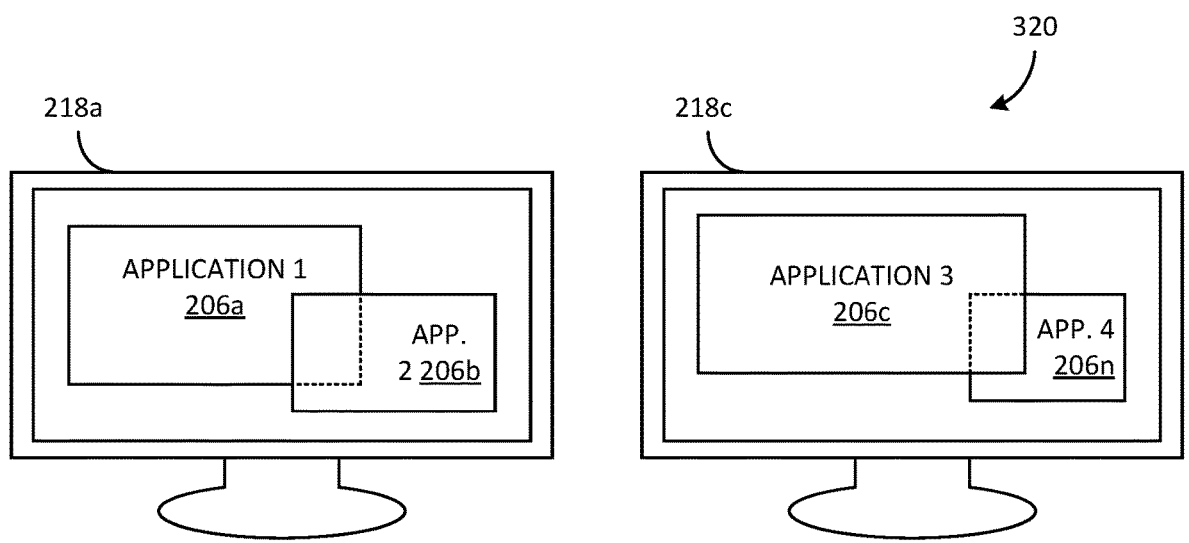

FIG. 3C illustrates a third view 320 that includes the first display 218a and the second display 218b. The third view 320 illustrates, on first display 218a, the first application 206a presented in a larger size than the second application 206b such that the number of pixels required on the first display 218a to present the first application 206a is greater than the number of pixels required to present the second application 206b. In addition, the second application 206b partially overlaps the first application 206a such that only a portion of the first application 206a is visible on the first display 218a. On the second display 218b, the third application 206c is presented in a larger size than the fourth application 206n such that the number of pixels required on the second display 218b to present the third application 206c is greater than the number of pixels required to present the fourth application 206n. In addition, the third application 206c partially overlaps the fourth application 206n such that only a portion of the fourth application 206n is visible on the second display 218b.

In some implementations, each of the one or more of the applications 206 has an optimal or preferred refresh rate at which to refresh in order to provide an optimal or preferred experience for the user. The optimal or preferred refresh rate may be a constant refresh rate or a variable refresh rate. For example, the optimal or preferred refresh rate for a video application is a constant refresh rate. As described herein, video is filmed and presented at a constant cadence of refreshing the frame being presented, so the optimal or preferred refresh rate is a constant refresh rate that matches that cadence, such as 24 Hz, 30 Hz, 60 Hz, and so forth. On the other hand, the optimal or preferred refresh rate for a gaming application may be a variable refresh rate. For example, a gaming application may present different scenes with different frames that sometimes take longer to render than other frames. Thus, the optimal or preferred refresh rate for a gaming application may be variable in order to accommodate longer refresh times for frames that take longer to render and shorter refresh times for frames that take a shorter time to render.

In some implementations, an application 206 is configured to control a refresh rate for the display 218 the particular application 206 is presented on in scenarios where the application 206 is identified as in full screen mode for the display 218. For example, upon receiving an indication that the first application 206a is in full screen mode on the first display 218a, the window manager 224 allows the application 206 to render all the content 207 of the first application 206a on the first display 218a at the refresh rate that is optimal or preferred for the first application 206a. In some examples, the window manager 224 determines the optimal or preferred refresh rate for the first application 206a by querying the first application 206a and then receiving a response that includes the optimal or preferred refresh rate. In other examples, the optimal or preferred refresh rate of the first application 206a is stored as data 214 in the data storage device 212 and the window manager 224 queries the data storage device 212 and retrieves the optimal or preferred refresh rate from the index 215.

As described herein, the window manager 224 may enable multiple refresh rates, such as a first refresh rate for the first display 218a and a second refresh rate for the second display 218b. In one example, the window manager 224 provides an independent composition rate for each display 218. In this example, the window manager 224 wakes every time each display 218 needs to update the rendered content 207 and times a signal that is sent to each display 218 to the waking cadence. Thus, each frame produced by the window manager 224 for each display 218 is as fresh as possible, making animations on each display 218 as smooth as possible. Applications 206 are woken by the per display cadence, enabling an optimal or preferred alignment with the window manager 224 and each of the displays 218. In this example, multiple displays 218 may refresh at different refresh rates simultaneously, each display 218 may be refreshed at the optimal or preferred rate, and applications 206 may wake at the speed of the desired display 218 without the need to implement an independent flip process.

This example may provide optimal support for a display 218 that does not support a variable refresh rate. However, this example also causes the window manager 224 to wake more often and render additional frames, which requires additional processing power and battery consumption.

In another example, the window manager 224 has a single dynamic composition rate. In this example, the window manager 224 has a single composition rate which drives all the composed content. While the window manager 224 wakes on a single clock, each display 218 receives a signal to best match composed frame timings to each display 218. The clock 222 that the window manager 224 is sourced from may change, depending on configuration and displays 218 to allow for boosting, or even matching certain refresh rates for a particular scenario. In examples where an application 206 is presented in the full screen mode on a display 218, the application 206 may receive multiplane overlay (MPO) and iFlip to drive the refresh rate on its target display 218 while the composition clock 222 drives the rest of the displays 218. An overlay enables the rendering of an image to the display 218. An MPO allows the window manager 224 to coordinate a set of hardware overlays, each of which contains a separate image to be composited by hardware, such as a GPU, rather than the window manager 224, onto the display 218. iFlip uses a flip model swap chain where application frames are sent directly to the display 218 with the same efficiency as an exclusive full screen application and the frames may be flipped independently of the window manager 224.

As described herein, a swap chain is a collection of buffers that are used for displaying frames on a display, such as a monitor. A swap chain may be associated with a particular application, an operating system, a graphics infrastructure, and so forth. For example, the flip model swap chain utilized by iFlip is a setting that enhances performance and draws directly into a buffer of the window manager 224. In yet another example, a graphics infrastructure swap chain is tied to a particular window upon creation of the swap chain. In yet another example, a composition swap chain may be implemented by a particular API that allows an application to host content. The composition swap chain differs from the graphics interface swap chain by enabling a present to target a specific time to appear, at the PresentAt time, whereas the graphics interface swap chain does not.

If all displays 218 in the system 200 are capable of executing a variable refresh rate, then the window manager 225 may run each display in a variable refresh rate mode and use the composition clock(s) 222 to drive all the displays 218 together. In this example, a number of benefits may be realized, including: frames are lower latency and smoother on each display 218, a single composed scene may be more easily maintained, additional workload is not added to the window manager 224, applications 206 are able to select the optimal or preferred refresh rate for each display 218, the clock 222 is able to switch to match better rates than the primary refresh rate, and no changes are needed to the clock 222. However, this example also may cause each refresh rate to not be matched exactly, CPU/GPU driven clocks 222 may not match the display 218 refresh rates, and applications 206 which wake on a primary vblank may be see misaligned frame timings.

Figure 4:
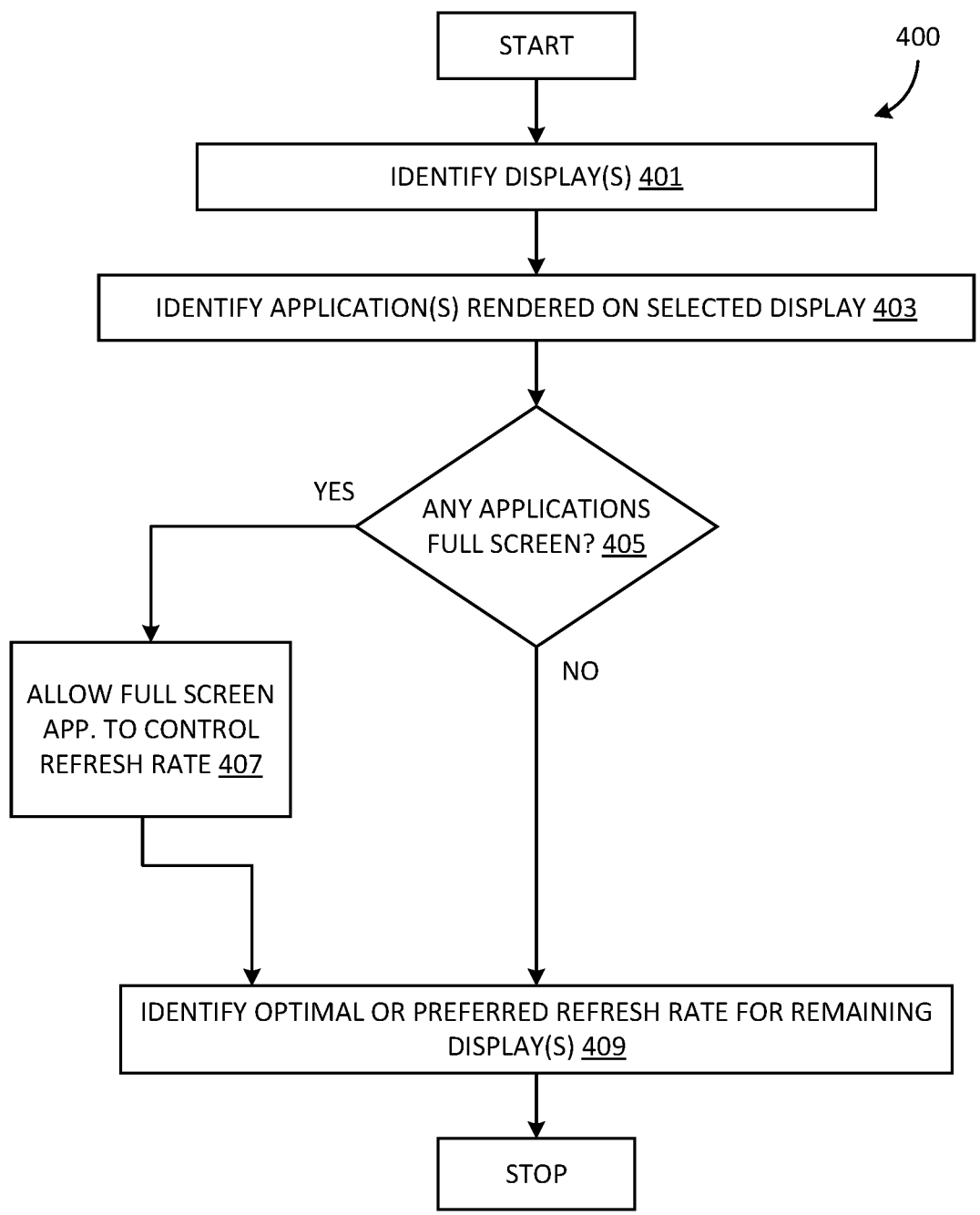
FIG. 4 is a flow chart illustrating a computer-implemented method of identifying whether a display may be refreshed at an independent rate according to various examples of the present disclosure.

Thus, according to various examples presented herein, the window manager 224 may have a single dynamic composition rate for all displays 218 that are not presenting full screen applications such that the composition clock 222 may be separated from the refresh rate of the display 218 presenting full screen content. Therefore, the window manager 224 may change the source of the clock 222 depending on which application 206 is in control of the refresh rate on a particular display 218. For example, the window manager 224 is implemented on the at least one processor 208 and may identify an optimal or preferred refresh rate for the displays 218 that are not presenting full screen applications and therefore do not have the refresh rate controlled by a particular application. For example, FIG. 4 is a flow chart illustrating a computer-implemented method of identifying whether a display may be refreshed at an independent rate according to various examples of the present disclosure. The computer-implemented method 400 is presented for illustration only and should not be construed as limiting. Various examples of the computer-implemented method 400 may be performed without departing from the scope of the present disclosure.

The computer-implemented method 400 begins by the window manager 224 identifying one or more displays 218 rendering content 207 in operation 401. The computer-implemented method 400 may be initiated through various triggers, including but not limited to the system 200 being turned on, a new display 218 being detected, a new application 206 being detected on at least one display 218, or the computer-implemented method 400 automatically executing at a particular interval. In some examples, only one display 218 is detected in operation 401. In other examples, as illustrated in FIGS. 3A-3C, more than one display 218 is detected, such as the first display 218a and the second display 218b. However, it should be understood these examples are presented for illustration only. More than two displays 218 may be detected without departing from the scope of the present disclosure. In these examples, the window manager 224 identifies the first display 218a and the second display 218b.

In operation 403, the window manager 224 identifies one or more applications 206 presently rendered on the identified displays 218. For example, the window manager 224 may identify one or both of the first application 206a and the second application 206b as applications that are presently rendering content 207 on the first display 218a and one or both of the third application 206c and the fourth application 206d as applications that are presently rendering content 207 on the second display 218b, as illustrated in FIG. 2.

In operation 405, the window manager 224 determines whether any of the applications 206 identified as presently rendered on the identified display(s) 218 are presenting in a full screen mode. As referenced herein, a full screen mode refers to a scenario where a single application 206 is rendered on the entire display 218 or on a large enough area of the selected display 218 such that other applications 206 are not able to also be rendered. Accordingly, the window manager 224 may prioritize refresh rates to the applications 206 being presented in full screen mode through iFlip and/or direct flip (dFlip). In direct flip, the application swap chain is used to display the content on the display 218 instead of the swap chain of the window manager 224.

In examples where one of the applications 206 is determined to be in the full screen mode, the computer-implemented method 400 proceeds to operation 407. In examples where none of the applications 206 are determined to be in the full screen mode, the computer-implemented method 400 proceeds to operation 409. In operation 407, the window manager 224 identifies the application 206 identified as rendering in the full screen mode and enables the full screen application to set the refresh rate for the respective display 218. In other words, the full screen application 206 refreshes the display 218 upon which its content 207 is rendered at the optimal or preferred rate for the particular application 206. As described herein, the window manager 224 may set the refresh rate for the selected display 218 by querying the application 206 executing in full screen mode and receiving an indication of the optimal or preferred refresh rate or by retrieving the optimal or preferred refresh rate from the data storage device 212.

Thus, the system 200 prioritizes granting the full screen content a custom refresh rate and, when possible, enables the application 206 itself to control the refresh rate for the entire display 218 for the duration of time the application 206 is presented in full screen mode.

In operation 409, the window manager 224 identifies the optimal or preferred refresh rate for the remaining display(s) 218. For example, where the window manager 224 has a single dynamic composition rate, the processor 208 may separate the composition clock 222 from the refresh rate of the display 218 presenting full screen content. By separating the composition clock 222 from the refresh rate of the display 218 presenting full screen content, the window manager 224 may change the source of the composition clock 222 depending on whether a particular application 206 is in control of the refresh rate of the display 218 presenting full screen content, rather than assuming the rate of composition if reliable and tied to a display designated as a primary display. In order to match refresh rates to content, the window manager 224 may prioritize granting full screen content a custom refresh rate through iFlip and/or dFlip. For example, iFlip and dFlip enable the window manager 224 to separate its own composition rate from the refresh rate of a given screen, such as a display 218, or frame rate of content. Then, the application may use one of iFlip or dFlip to continue flipping.

The window manager 224 may source the refresh rate for additional displays 218 either by sourcing the refresh rate from another display or from a separate timer. Where the refresh rate is sourced from another display, a greedy algorithm is implemented to identify the next highest refresh rate display 218 whose refresh rate is not being driven by an application and derive the composition clock 222 from the display 218. This example addresses stuttering issues with media and gaming applications, precisely matches the refresh rate of one display 218 in the system 200, supports enough displays with MPO/iFlip/dFlip for multi-display scenarios, and supports temporarily boosting the refresh rate on a per-display basis and prefers a boostable display. As described herein, by granting MPO, an application may update its swap chain without being copied into the swap chain of the window manager 224. iFlip and dFlip enable the content of the application to flip at its own rate, which allow the window manager 224 to divert resources to another content source. However, this example may cause one or more displays 218 to not match the composition rate in three or more display 218 setups if one or more of the displays 218 is not configured with a variable refresh rate. In some examples, the execution of the greedy algorithm may cause less power to be utilized as the composition rate increases because the refresh rate is no longer linked to a primary monitor. Where the refresh rate is sourced from a separate timer, the window manager 224 may fall back onto the separate timer, such as the CPU 208*a* timer or the GPU 208*b* timer, rather than having another display 218 refresh at as close to a particular refresh rate, such as 60 Hz, as possible. This example addresses stuttering issues with media and gaming applications, uses a constant clock, supports enough displays with MPO/iFlip/dFlip for multi-display scenarios, supports boosting on a display 218, and is unlikely to regress power. However, this example is unlikely to match the refresh rate on non-variable refresh rate displays and the displays 218 may have a high latency.

For example, three displays 218 may be identified in operation 401. The first display 218 may have a variable refresh rate of 240 Hz, the second display 218 may have a variable refresh rate of 144 Hz, and the third display 218 may have a fixed refresh rate of 60 Hz. Each display 218 may be presenting non-full screen applications. In this example, the processor 208 may create a GPU 208*b* timer that is dynamic between 60 Hz and 120 Hz so that the first and second displays, which have variable refresh rates, have content updated at a power efficient and smooth rates, while the third display receives a steady cadence of frames at 60 Hz.

Accordingly, the refresh rate for additional displays 218 that are not presently rendering content 207 for an application 206 presented in full screen mode may be determined based on a combination of factors. The factors may include, but are not limited to, a size of the applications 206 rendered on the display(s) 218, the types of the applications 206 rendered on the display(s) 218 (e.g., a video application, a gaming application, a word processing application, a web browser application, and so forth), the locations on the display 218 of the applications 206 rendered on the display 218, whether an application 206 is presented in front of or behind another application 206, hardware capabilities of the particular display 218, GPU processing capabilities, and so forth. In some examples, the factors are prioritized automatically. For example, the highest priority may be determined to be a top application 206 that is presented in front of all other applications 206 presented on the display 218. In another example, the highest priority may be a video application. In another example, the highest priority may be an application 206 presented in a particular area of the display 218 that presents an ergonomical advantage for a user viewing the display 218. In another example, the highest priority may be an application 206 that uses the least processing power or provides the least amount of battery consumption of the applications 206 presented on the display 218.

As described herein, the refresh rate of a particular display 218 may be updated, or changed, at various times as content 207 is presented on one or more displays 218. For example, a refresh rate may be changed due to a new application 206 being launched, an application 206 being closed that was previously presenting content 207, a new application 206 being newly presented in full screen mode, an application 206 previously presented in full screen mode being switched out of the full screen mode, and so forth. The window manager 224 works to show batches of content updates and tokens in time with the composition cadence in order for all the applications 206 to continue running smoothly and with as little interruption as possible. In some examples, an API, such as the composition swap chain, is implemented so that different media may request a timing for new frames. In this example, the window manager 224 provides the frames at the correct time on the correct display based on the available composition rate. In some examples, such as displays 218 that execute a dynamic refresh rate that may be temporarily boosted, an additional API for a composition clock 222 may be implemented.

In some implementations, an application 206 may set a custom frame rate only when the application 206 is in full screen mode in order to ensure improved compatibility for other applications in the system 200. In other implementations, an application 206 may set the custom frame rate when the application 206 is determined to have met various thresholds. For example, the application 206 may be permitted to set the custom frame rate when the application 206 takes up a particular amount of space on its respective display 218, has no other applications 206 overlaid on it, and is a particular type of application 206, such as a gaming application. In other examples, more or fewer requirements may be set for the application 206 to set the custom frame rate.

An application 206 may commit its content 207, i.e., render a new frame of content 207, at times separate from the composition clock 222 based on whether the application 206 is informed on the real composition clock 222. For example, FIGS. 5A-5D are timeline diagrams illustrating various respective timelines for independent refresh rates according to various examples of the present disclosure. Throughout the examples illustrated in FIGS. 5A-5D, the presentation cadence and the window manager 224 processing cadence are maintained, and frames are queued, at the speed of what is determined to be the optimal or preferred refresh rate. Accordingly, each of the timeline diagrams 500, 510, 520, 540 show independent refresh rate selection results in improved frames being selected for each display in the system, removing or mitigating unpredictability and replacing with more consistent, lower latency frame options.

Figure 5A:
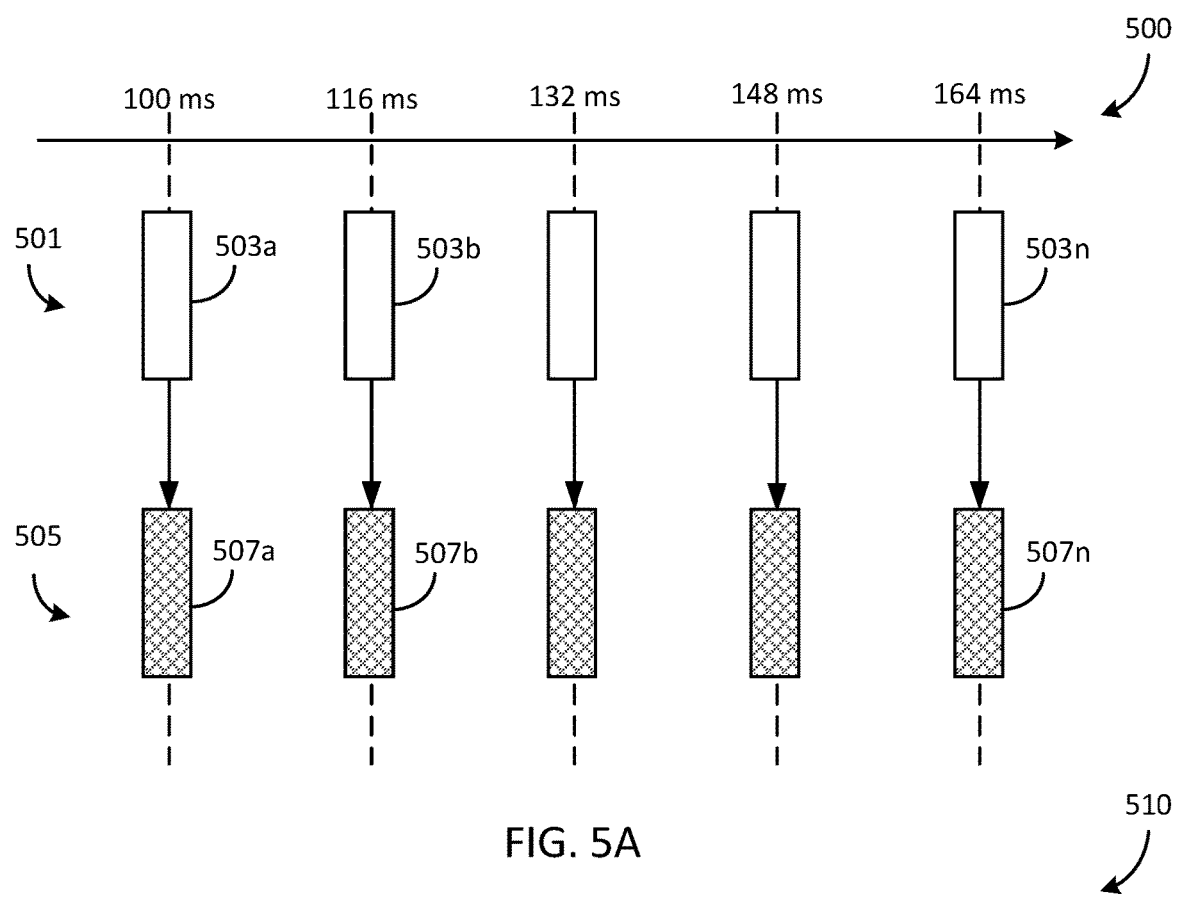
FIGS. 5A-5D are timeline diagrams illustrating respective timelines for independent refresh rates according to various examples of the present disclosure.

FIG. 5A illustrates a first timeline diagram 500 that illustrates a first display 501 refreshing at a first refresh rate and a second display 505 refreshing at a second refresh rate that is the same as the first refresh rate. For example, each of the first refresh rate and the second refresh rate may be 60 Hz. Each of the first display 501 and the second display 505 may be an example of a display 218. It should be understood that the timeline presented in FIG. 5A is for illustration only and should not be construed as limiting.

As shown in the first timeline diagram 500, due to each of the first display 501 and the second display 505 refreshing at the same refresh rate, the first display 501 refreshes to frames 503 at the same time the second display 505 refreshes to render frames 507. For example, the first display 501 refreshes to render a first frame 503a at the same time, 100 ms, the second display 505 refreshes to render a first frame 507a, the first display 501 refreshes to render a second frame 503b at the same time, 116 ms, the second display 505 refreshes to render a second frame 507b, and so forth through an nth frame, shown in FIG. 5A as an nth frame 503n and an nth frame 507n at time=164 ms. It should be understood that despite the first display 501 and the second display 505 refreshing at the same refresh rate, the frames may not be perfectly aligned because the clock 222 for the first display 501 is not aligned with the clock 222 for the second display 505. Thus, the frames 503 may be offset and out of phase from the frames 507 despite the first display 501 and the second display 505 refreshing at the same refresh rate.

Accordingly, as shown in FIG. 5A, the refresh rate of 60 Hz is the fastest refresh rate for each of the first display 501 and the second display 505. Even in scenarios where one of the first display 501 and the second display 505 is configurable to refresh at a higher refresh rate or at a variable refresh rate, based on the applications 206 presently executing on each of the first display 501 and the second display 505, the refresh rate of 60 Hz enables the window manager 224 to send pulses to both the first display 501 and the second display 505 simultaneously. For example, even where the first display 501 is presenting a variable refresh rate gaming application with an independent refresh rate and 60 Hz display driving the composition of each frame, the two displays may be refreshed at the same refresh rate by the window manager 224 sending pulses to refresh at 60 Hz to each display.

Figure 5B:
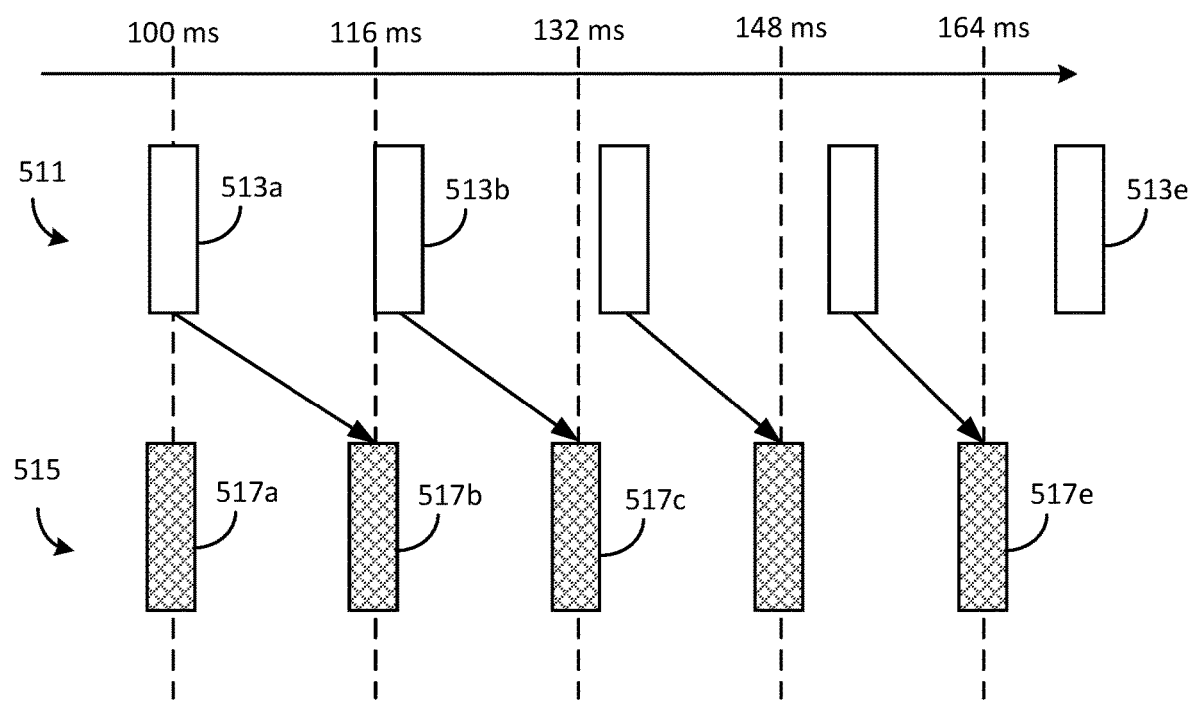

FIG. 5B illustrates a second timeline diagram 510 that illustrates a first display 511 refreshing at a first refresh rate and a second display 515 refreshing at a second refresh rate that is different than the first refresh rate. For example, the first refresh rate may be 64 Hz and the second refresh rate may be 60 Hz. Each of the first display 511 and the second display 515 may be an example of a display 218. It should be understood that the timeline presented in FIG. 5B is for illustration only and should not be construed as limiting.

The second timeline diagram 510 may be an example where the first display 511 is a 64 Hz display and the second display 515 is a 60 Hz display. While the first frame 513a of the first display 511 and the first frame 517a of the second display 515 are aligned, the second frame 513a of the first display 511 is not aligned with the second frame 517b of the second display 515 due to the first display 511 refreshing at a slower frequency than the second display 515. However, the second timeline diagram 510 further illustrates that the second frame 517b is timed with the first frame 513a, rather than the second frame 513a, as is shown in the first timeline diagram 500. The third frame 517c is timed with the second frame 513b, and so forth through the nth frames 513n and 517n, so that although the first display 511 and the second display 515 are never perfectly aligned as in the first timeline diagram 500, due to the first display 511 and the second display 515 refreshing at different rates, the window manager 224 and the application workloads will be constant. While animations rendered on the first display 511 and the second display 515 may subtly speed and/or slow down, the process presented in the second timeline diagram 510 provides an improved sequence, smoother presentation, and reduced processing power and battery consumption than conventional solutions. Accordingly, the first display 511 and the second display 515 will not be perfectly aligned due to the differences in their respective refresh rates.

Figure 5C:
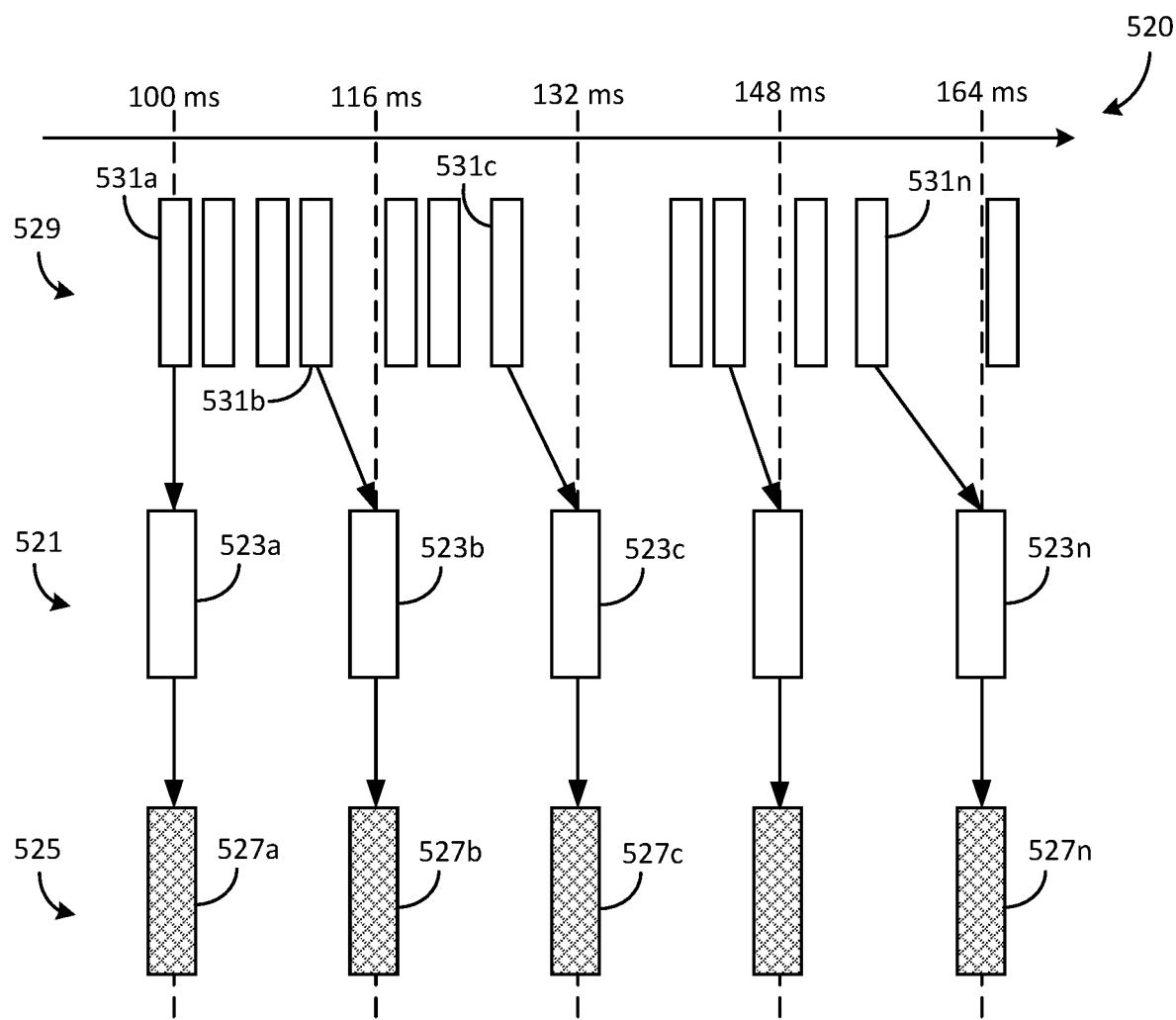

FIG. 5C illustrates a third timeline diagram 520 that illustrates a first display 521 refreshing at a first refresh rate, a second display 525 refreshing at the first refresh rate, and a series 529 of variable refresh rate updates at a second refresh rate that is variable and higher than the first refresh rate. For example, the first refresh rate may be 60 Hz while the second refresh rate is a variable 144 Hz refresh rate. Each of the first display 521 and the second display 525 may be an example of a display 218. The third timeline diagram 520 may be presenting, for example, a variable refresh rate gaming application executing on a 60 Hz display. As shown in FIG. 5C, the system 200 may have an independent refresh rate that enables the gaming application to control the refresh rate of the third display 529. The gaming application may use primary vblanks with a graphics interface swap chain. It should be understood that the timeline presented in FIG. 5C is for illustration only and should not be construed as limiting.

The window manager 224 refreshes the first display 521 using the most recently received application content at the same refresh rate. For example, the first frame 531a of the series 529 of variable refresh rate updates is received and rendered, at time=100 ms, as the first frame 523a on the first display 521 and the first frame 527a on the second display 525. However, due to the series 529 of variable refresh rate updates refreshing at a variable refresh rate that is higher than the 60 Hz refresh rate of the first display 521 and the second display 525, each of the first display 521 and the second display 525 refresh at a refresh rate of 60 Hz based on the most recently received frame 531 from the series 529 of variable refresh rate updates. For example, the series 529 of variable refresh rate updates, refreshing to additional frames, before the next frame 531b that is rendered on the first display 521 as the second frame 523b and on the second display 525 as the second frame 527b, then again before the next frame 531c that is rendered on the first display 521 as the third frame 523c and on the second display 525 as the third frame 527c, and so forth until the nth frame 531n that is rendered on the first display 521 as the nth frame 523n and on the second display 525 as the nth frame 527n. Therefore, while some frames of the series 529 of variable refresh rate updates are not reflected on either the first display 521 or the second display 525, the frames presented on the first display 521 and the second display 525 better align and more evenly spaced than the frames received from the series 519 for a smoother animation experience. As in FIG. 5B, the first display 521 and the second display 524 may never be perfectly aligned, but the distance between the refreshed frames may be constant due to the refresh rate being the same for each of the first display 521 and the second display 525.

Figure 5D:
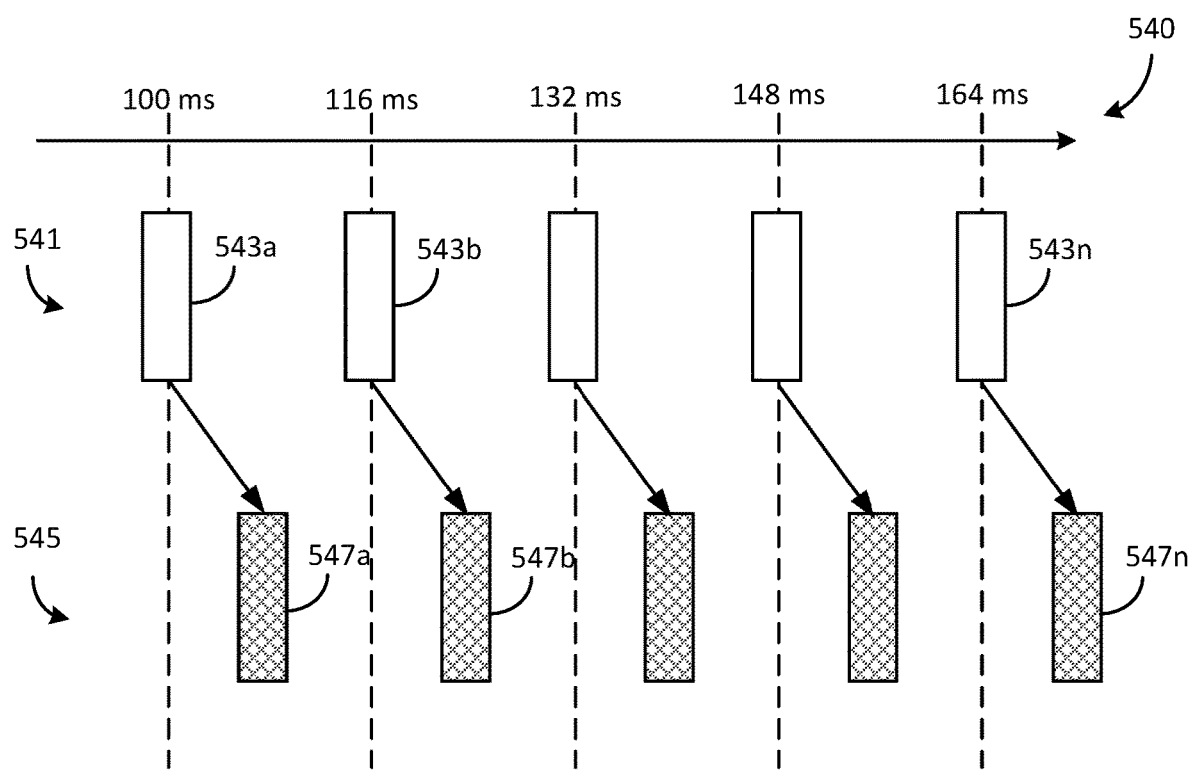

FIG. 5D illustrates a fourth timeline diagram 540 that illustrates a first display 541 refreshing at a first refresh rate and a second display 545 refreshing at a second refresh rate that is the same as the first refresh rate. For example, each of the first refresh rate and the second refresh rate may be 60 Hz. Each of the first display 541 and the second display 545 may be an example of a display 218. It should be understood that the timeline presented in FIG. 5D is for illustration only and should not be construed as limiting.

As shown in the fourth timeline diagram 540, the first display 541 refreshes to frames 543 at the same rate the second display 545 refreshes to render frames 547. However, due a phase shift, the period is different and the time the frames 547 are rendered differs from a time the frames 543 are rendered. For example, the first display 541 refreshes to render a first frame 543a at a time, 100 ms, and the second display 545 refreshes to render a first frame 547a at an expected time, such as 8 ms, later than the first frame 543a is rendered. Because the first display 541 and the second display 545 are refreshed at the same refresh rate, the first display 541 and the second display 545 refreshes at marginally different times is minor. Thus, the first display 541 refreshes to render a second frame 543b at time=116 ms, the second display 545 refreshes to render a second frame 547b at time=124 ms, and so forth through an nth frame, shown in FIG. 5D as an nth frame 543n and an nth frame 547n at time=172 ms.

In some examples, the second display 545 may be a third display in a system. For example, the system 200 presented and being refreshed in the fourth timeline diagram 540 may include a second display that refreshes at the same time as the first display 541, such as shown in the first timeline diagram 500, in addition to the display 545.

Figure 6A:
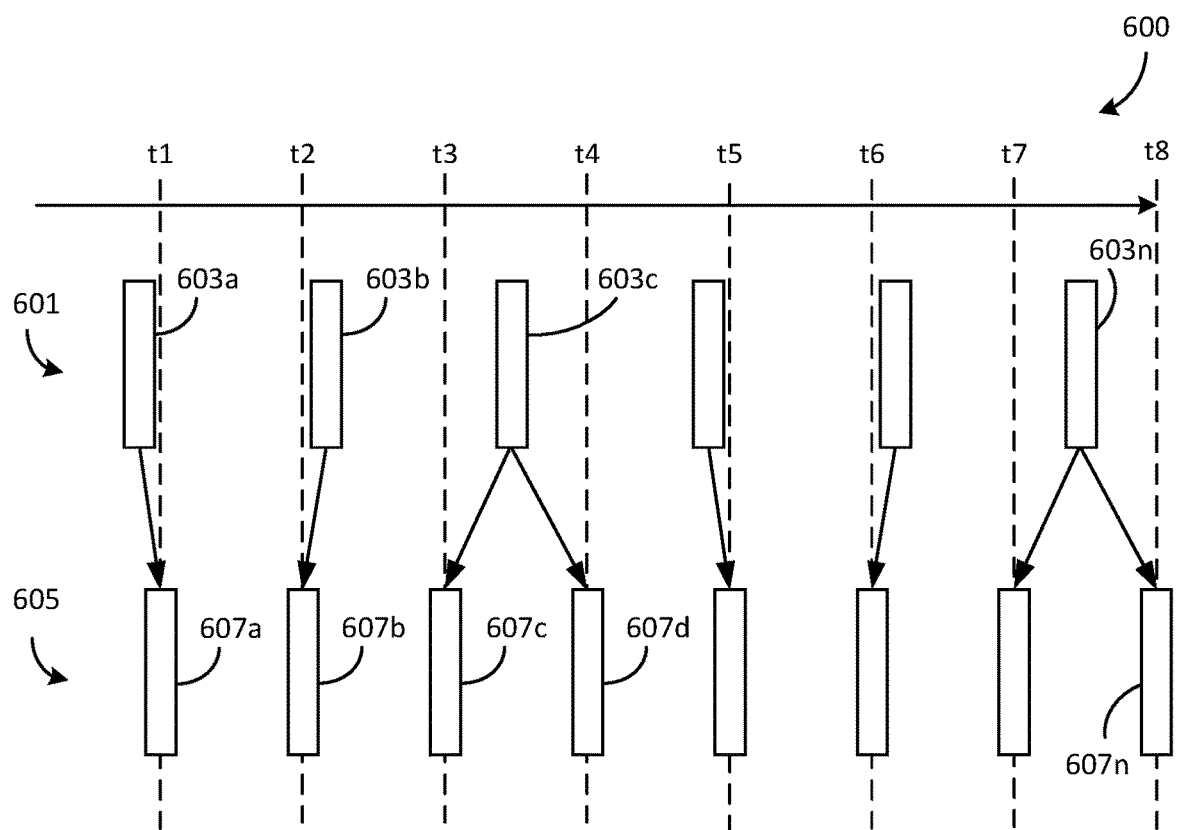
FIGS. 6A-6B are timeline diagrams illustrating respective timelines for independent refresh rates according to various examples of the present disclosure.
Figure 6B:
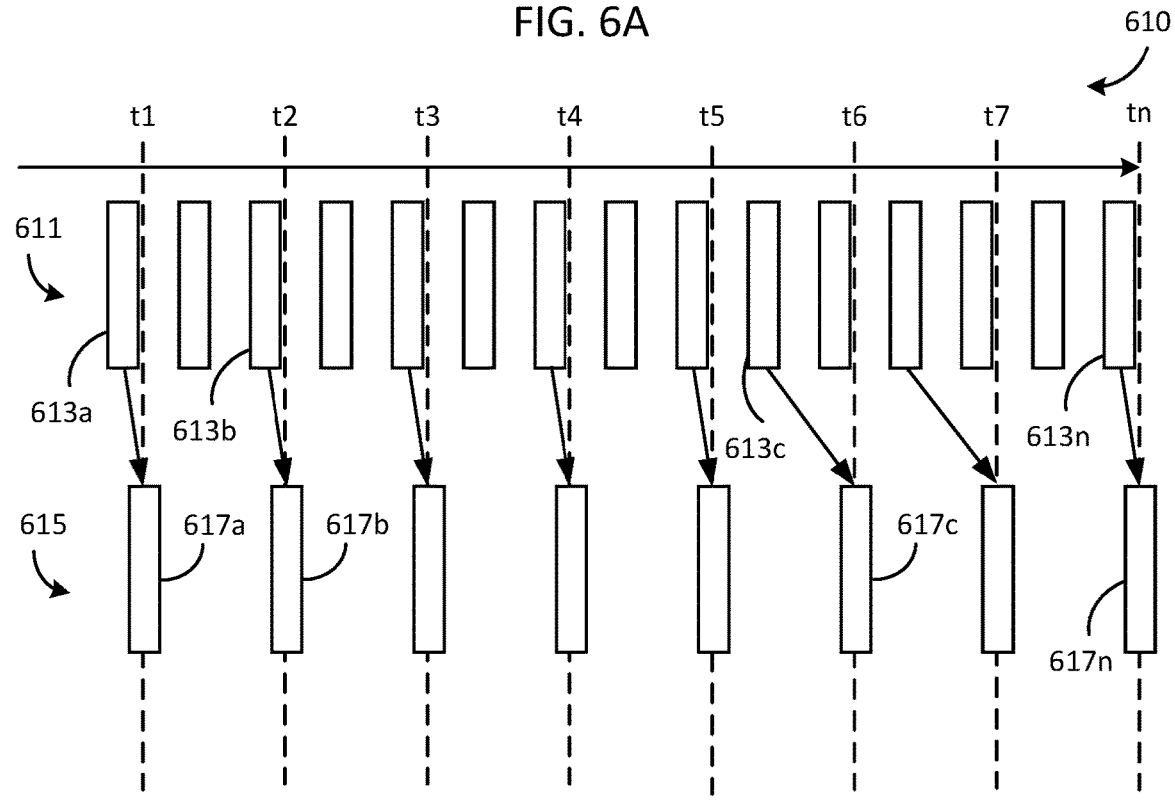

FIGS. 6A-6B are timeline diagrams illustrating respective timelines for independent refresh rates according to various examples of the present disclosure. The timeline diagrams illustrated in FIGS. 6A-6B illustrate a first display operating at a first refresh rate, such as 60 Hz, duplicating media at a second refresh rate, such as 24 Hz, to a secondary display with a maximum refresh rate between the first refresh rate and the second rate, such as 30 Hz. It should be understood that the timelines presented in FIGS. 6A-6B are for illustration only and should not be construed as limiting. Various other examples of the timelines may be implemented without departing from the scope of the present disclosure.

For example, FIG. 6A illustrates a timeline diagram 600 that illustrates a first display 601 refreshing at a first refresh rate and a second display 605 refreshing at a second refresh rate that is different than the first refresh rate. The first display 601 presents content 207 that refreshes twenty-four frames per second (fps), such as a video application, at a refresh rate of 60 Hz, while the second display 605 refreshes at 30 Hz. The application 206 presented in FIG. 6A uses the API PresentAt that implements the composition swap chain for video processing. The PresentAt functionality enables the present to be targeted to a wall clock time, rather than specific vblank, enabling the window manager 224 to determine at which time to refresh. As shown in FIG. 6A, the first display 601 and the second display 605 refresh at slightly different refresh rates, so the window manager 224 causes the second display 605 to match the best frame of the first display 601 to display for the second display 605. For example, the first frame 603a of the first display 601 is pulled and the first frame 607a of the second display 605 is pulled to match the first frame 603 at time=t1, the second frame 607b of the second display 605 is pulled to match the second frame 603b at time=t2, and each of the third frame 607c and fourth frame 607d are pulled to match the third frame 603c of the first display 601 at times=t3 and t4, respectively. This pattern continues through the nth frame 603n and the nth frame 607n.

FIG. 6B illustrates a timeline diagram 610 that illustrates a first display 611 refreshing at a first refresh rate and a second display 615 refreshing at a second refresh rate that is different than the first refresh rate. The first display 601 presents content 207 that refreshes twenty-four frames per second (fps), such as a video application, at a refresh rate of 60 Hz, while the second display 605 refreshes at 30 Hz. The application 206 presented in FIG. 6B uses a swap chain with an explicit 3:2 pulldown ratio for video processing.

As shown in FIG. 6B, the first display 611 and the second display 615 refresh at slightly different refresh rates, so the window manager 224 causes the second display 615 to match the best frame of the first display 611 to display for the second display 615. For example, the first frame 613a of the first display 611 is pulled and the first frame 617a of the second display 615 is pulled to match the first frame 613 at time=t1, a frame in the first display 611 is skipped before the second frame 617b of the second display 615 is pulled to match the second frame 613b at time=t2, and so forth until a frame is not skipped in the first display 611 and a third frame 617c of the second display 615 is pulled to match a third frame 613c of the first display 611 at time=t6. The pattern continues until two frames are skipped in the first display 611 an an nth frame 617n of the second display 615 is pulled to match an nth frame 613n of the first display 611 at time=tn.

As shown in each of FIGS. 6A-6B, the rendered frames get much closer to the desired timings while also providing lower latency. While some frames are carried longer, depending on the pattern these frames may be either more spread out or more condensed in a single speed up/speed down. Accordingly, the present disclosure provides improved outcomes when the different displays in a system have different refresh rates and/or when the window manager 224 is able to control to refresh content at different refresh rates than the optimal or preferred refresh rate(s) of the displays in the system.

Figure 7:
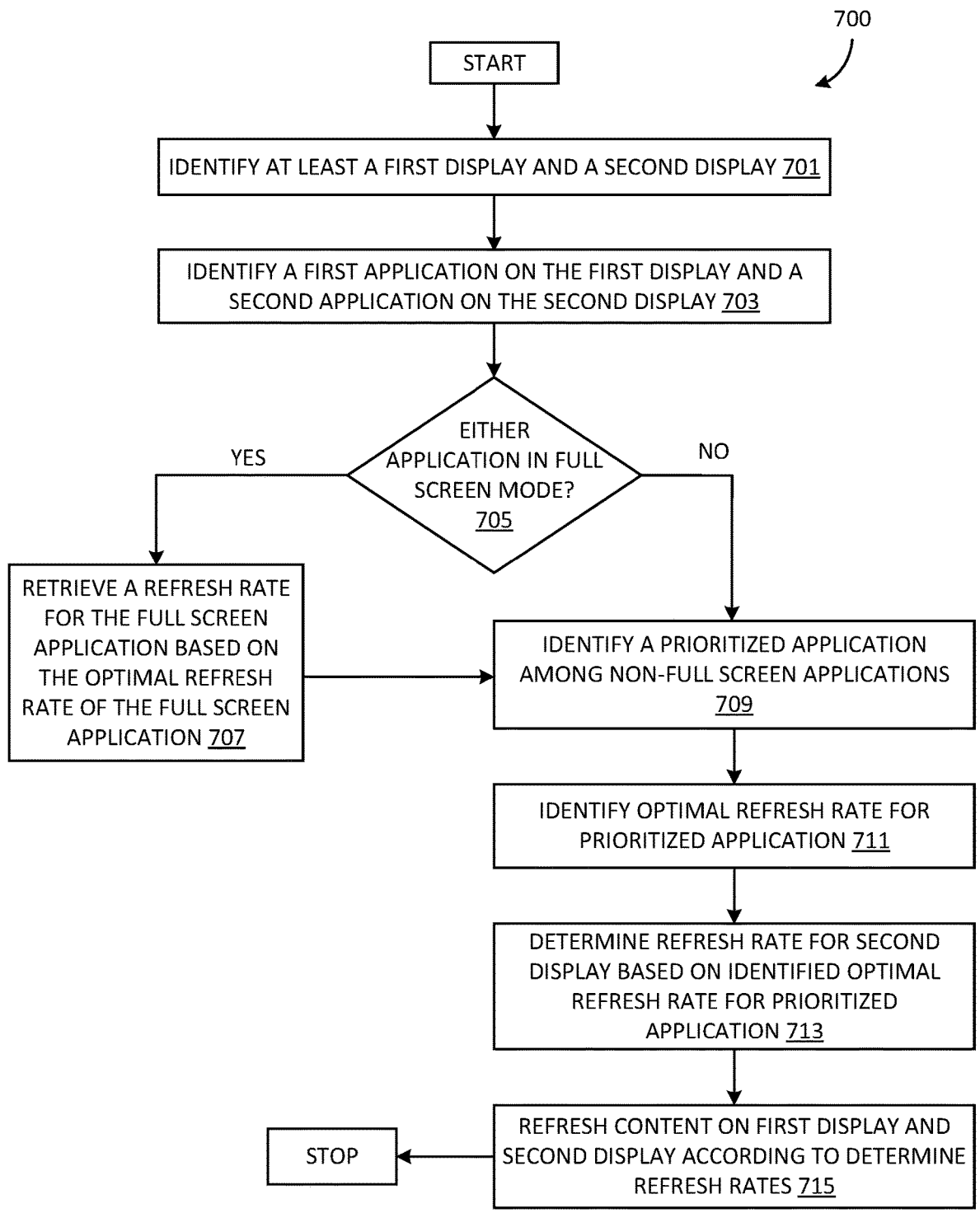
FIG. 7 is a flow chart illustrating a computer-implemented method of refreshing multiple monitors at independent refresh rates according to various examples of the present disclosure.

FIG. 7 is a flow chart illustrating a computer-implemented method of refreshing multiple monitors at independent refresh rates according to various examples of the present disclosure. The operations illustrated in FIG. 7 are for illustration and should not be construed as limiting. Various examples of the operations may be used without departing from the scope of the present disclosure. The operations of the flow chart 700 may be executed by one or more components of the system 200, including the processor 208, the window manager 224, and one or more of the displays 218.

The flow chart 700 begins by the window manager 224 identifying at least a first display 218a and a second display 218b in operation 701. As described herein, the operations of the flow chart 700 may be initiated through various triggers, including but not limited to the system 200 being turned on, a new display 218 being detected, a new application 206 being detected on at least one display 218, or the flow chart 700 may be initiated automatically at a particular interval. In some examples, more than two displays 218 may be identified. For example, three or more displays 218 may be identified without departing from the scope of the present disclosure. The identified displays 218 may be identified as connected to other element(s) of the system 200 via a wired connection or a wireless connection. Examples of wired methods include a high-definition multimedia interface (HDMI) cable, a universal serial bus (USB) cable such as a USB-C cable, a digital visual interface (DVI) cable, or any other suitable cable for connecting a monitor to the system 200. Examples of wireless methods include Bluetooth™ connection, a wireless internet connection such as Wi-Fi™, or any other suitable method.

In operation 703, the window manager 224 identifies at least a first application 206a presenting, or rendering, first content 207a on the identified first display 218a and at least a second application 206b presenting second content 207b on the identified second display 218b. In some examples, one or more of the first display 218a or the second display 218b presents more than one application 206 each. For example, as illustrated in FIG. 3A, one or both of the first display 218a and the second display 218b may present at least two applications 206. In other examples, one or both of the first display 218a and the second display 218b may present only one application 206. In other examples, one display, such as the second display 218b, may present both the content 207b and content 207c from a third application 206c.

In operation 705, the window manager 224 determines whether any of the identified applications 206 presently presenting content 207 on either of the first display 218a or the second display 218b is presenting the respective content 207 in a full screen mode. For example, as shown in FIG. 3B, a display 218 may present an application 206 in full screen mode such that the content 207 of the application 206 is presented on the entire display 218 or on a large enough area of the selected display 218 such that other applications 206 are not able to also be rendered. In examples where at least one application is determined to be presenting content 207 in full screen mode, the flow chart 700 proceeds to operation 707. In examples where none of the identified applications are determined to be presenting content 207 in full screen mode, the flow chart 700 proceeds to operation 709.

In operation 707, in response to at least one application 206 being determined to be presenting content 207 in full screen mode, the window manager 224 retrieves a refresh rate for the display 218 presenting the application 206 in full screen mode that is or is based on the optimal or preferred refresh rate of the full screen application 206. For example, where the first application 206a is determined to be presenting its content 207a in full screen mode on the first display 218a, the window manager 224 retrieves the optimal or preferred refresh rate for the first application 206a. In some examples, the window manager 224 retrieves the optimal or preferred refresh rate from the index 215. In other examples, the window manager 224 queries the first application 206a and then receives a response that includes the optimal or preferred refresh rate.

In operation 709, the window manager 224 identifies a prioritized application 206 among non-full screen applications 206 identified as presently presenting content 207. The prioritized application 206 may be identified through various methods. In some examples, the prioritized application 206 is identified based on a size of the applications 206 rendered on the display(s) 218, the types of the applications 206 rendered on the display(s) 218 (e.g., a video application, a gaming application, a word processing application, a web browser application, and so forth), the locations on the display 218 of the applications 206 rendered on the display 218, whether an application 206 is presented in front of or behind another application 206, hardware capabilities of the particular display 218, GPU processing capabilities, and so forth. For example, the application 206 may be determined to be occupying the largest amount of space on the display 218, and therefore is identified as the highest priority application 206. As another example, if one the identified applications 206 is a gaming application 206, the gaming application 206 may be automatically identified as the prioritized application 206 due to the higher refresh rate required for the gaming application 206 to present an optimal user experience. As yet another example, the window manager 224 may identify each executing application 206 in the index 215, identify the application 206 having the highest optimal or preferred refresh rate, and prioritize that application 206.

In some examples, the window manager 224 identifies an optimal or preferred refresh rate for the prioritized application 206 in operation 711. For example, the window manager 224 may identify the prioritized application 206 in the index 215 to look up, or retrieve, the optimal or preferred refresh rate for the prioritized application 206.

In operation 713, the window manager 224 determines the refresh rate for the display or displays 218 which are not presently presenting an application 206 in full screen mode. For example, as in FIG. 3B where the first display 218a presents the first application 206a in full screen mode but the second display 218b is not in full screen mode and presents the third application 206c and the fourth application 206n, the window manager 224 determines the refresh rate for the second display 218b. In some implementations, the window manager 224 determines the refresh rate for the second display 218b to be optimal or preferred refresh rate for the prioritized application 206. In other examples, the window manager 224 determines the refresh rate based on a combination of the factors used to identify the prioritized application 206. For example, the prioritized application 206 may be a gaming application, indicating the optimal or preferred refresh rate is a variable high refresh rate, but the hardware of the second display 218b may not support the variable high refresh rate. Thus, the window manager 224 may set the refresh rate at the highest refresh rate available for the second display 218b.

In operation 715, the content 207 is refreshed on the first display 218a and the second display 218b. For example, the first display 218a refreshes the first content 207a of the first application 206a at the refresh rate for the first application 206a in full screen mode and the second display 218b refreshes the second content 207b of the second application 206b at the determined refresh rate. Thus, the content 207 on different displays 218 may be refreshed at different refresh rates and according to different composition clocks 222. For example, the first display 218a may present the first content 207a in the full screen mode based on a composition clock 222 of the first application 206a, while the second display 218b may present the second content 207b based on a composition clock 222 of the window manager 224.

Additional Examples

Some examples herein are directed to a method of refreshing multiple monitors at independent refresh rates, as illustrated by the flow chart 700. The method (700) includes identifying (701) at least a first display device (218a) and a second display device (218b), identifying (703) at least a first application (206a) presenting first content (207a) on the identified first display device and at least a second application (206b) presenting second content (207b) on the identified second display device, in response to determining the first application is presenting the first content in full screen mode, retrieving (707) a refresh rate for the first display device based on an optimal refresh rate for the first application, determining (713) a refresh rate for the second display device, and causing (715) the first content to be refreshed on the first display device at the refresh rate for the first display device and the second content to be refreshed on the second display device at the refresh rate for the second display device.

In some examples, determining the refresh rate of the second display device further comprises: identifying an optimal refresh rate for the second content; and determining to refresh the second display device at the identified optimal refresh rate for the second display device.

In some examples, the method further comprises identifying a third application presenting third content on the identified second display device; identifying a prioritized application of the second application and the third application; and determining the refresh rate for the second display device as an optimal refresh rate for the identified prioritized application.

In some examples, identifying the prioritized application further comprises: determining the second application has a higher optimal refresh rate than the third application; and prioritizing the second application.

In some examples, the prioritized application is identified based on one or more factors selected from a size of the second application and the third application rendered on the second display device; a type of content rendered on the second display device by the second application and the third application; a location on the second display device of the second application and the third application; hardware capabilities of the second display device, and graphics processing unit (GPU) processing capabilities.

In some examples, the method further comprises refreshing the second content and the third content on the second display device at the refresh rate for the second display device based on a composition clock of a window manager.

In some examples, the method further comprises, in response to determining neither of the first application and the second application are presenting the first content or the second content, respectively, in full screen mode: identifying a prioritized application of the first application and the second application; and determining the refresh rate for the first display device and the second display device as an optimal refresh rate for the identified prioritized application.

In some examples, refreshing the first content on the first display device at the refresh rate for the first display device and the second content on the second display device at the refresh rate for the second display device further comprises: refreshing the second content on the second display device based on a composition clock of a window manager.

In some examples, the refresh rate for the first display device is different than the refresh rate for the second display device.

Although described in connection with an example computing device 100 and system 200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, servers, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A computer-implemented method, comprising:
    identifying a first display device and a second display device;
    identifying a first application presenting first content on the identified first display device and a second application presenting second content on the identified second display device;
    retrieving a refresh rate for the first display device based on an optimal refresh rate for the first application when the first application is presenting the first content in full screen mode;
    determining a refresh rate for the second display device;
    causing the first content to be refreshed on the first display device at the refresh rate for the first display device;
    causing the second content to be refreshed on the second display device at the refresh rate for the second display device; and
    providing an independent composition rate for the first display device and the second display device so that the first application wakes at a speed of the first display device and the second application wakes at a speed of the second display device.

2. The computer-implemented method of claim 1, wherein determining the refresh rate of the second display device further comprises:
    identifying an optimal refresh rate for the second content; and
    determining to refresh the second display device at the identified optimal refresh rate for the second display device.

3. The computer-implemented method of claim 1, further comprising:
    identifying a third application presenting third content on the identified second display device;
    identifying a prioritized application of the second application and the third application; and
    determining the refresh rate for the second display device as an optimal refresh rate for the identified prioritized application.

4. The computer-implemented method of claim 3, wherein identifying the prioritized application further comprises:
    determining the second application has a higher optimal refresh rate than the third application; and
    prioritizing the second application.

5. The computer-implemented method of claim 3, wherein the prioritized application is identified based on one or more factors selected from a size of the second application and the third application rendered on the second display device; a type of content rendered on the second display device by the second application and the third application; a location on the second display device of the second application and the third application; hardware capabilities of the second display device; and graphics processing unit (GPU) processing capabilities.

6. The computer-implemented method of claim 3, further comprising:
 refreshing the second content and the third content on the second display device at the refresh rate for the second display device based on a composition clock of a window manager.

7. The computer-implemented method of claim 1, further comprising, in response to determining neither of the first application and the second application are presenting the first content or the second content, respectively, in full screen mode:
 identifying a prioritized application of the first application and the second application; and
 determining the refresh rate for the first display device and the second display device as an optimal refresh rate for the identified prioritized application.

8. The computer-implemented method of claim 1, wherein:
 refreshing the first content on the first display device at the refresh rate for the first display device and the second content on the second display device at the refresh rate for the second display device further comprises:
  refreshing the first content on the first display device based on a composition clock of the first application; and
  refreshing the second content on the second display device based on a composition clock of a window manager.

9. The computer-implemented method of claim 1, wherein the refresh rate for the first display device is different than the refresh rate for the second display device.

10. A system, comprising:
 a first display and a second display;
 a memory storing instructions that are executable by a processor;
 the processor configured to execute the instructions stored on the memory; and
 a window manager, implemented on the processor, configured to:
  identify the first display and the second display,
  identify a first application presenting first content on the identified first display and a second application presenting second content on the identified second display,
  retrieve a refresh rate for the first display based on an optimal refresh rate for the first application when the first application is presenting the first content in full screen mode, and
  determine a refresh rate for the second display,
 wherein the first display is configured to refresh the first content on the first display at the refresh rate and the second display is configured to refresh the second content on the second display at the refresh rate based on a composition clock of the window manager.

11. The system of claim 10, wherein, to determine the refresh rate of the second display, the window manager is further configured to:
 identify an optimal refresh rate for the second content; and
 determine to refresh the second display at the identified optimal refresh rate for the second display.

12. The system of claim 10, wherein the window manager is further configured to:
 identify a third application presenting third content on the identified second display;
 identify a prioritized application of the second application and the third application; and
 determine the refresh rate for the second display as an optimal refresh rate for the identified prioritized application.

13. The system of claim 12, wherein, to identify the prioritized application, the window manager is further configured to:
 determine the second application has a higher optimal refresh rate than the third application; and
 prioritize the second application.

14. The system of claim 12, wherein the window manager is further configured to identify the prioritized application based on one or more factors selected from a size of the second application and the third application rendered on the second display; a type of content rendered on the second display by the second application and the third application; a location on the second display of the second application and the third application; hardware capabilities of the second display; and graphics processing unit (GPU) processing capabilities.

15. The system of claim 12, wherein the window manager is further configured to:
 refresh the second content and the third content on the second display at the refresh rate for the second display based on a composition clock of a window manager.

16. The system of claim 10, wherein, in response to determining neither of the first application and the second application are presenting the first content or the second content, respectively, in full screen mode, the window manager is further configured to:
 identify a prioritized application of the first application and the second application; and
 determine the refresh rate for the first display and the second display as an optimal refresh rate for the identified prioritized application.

17. A computer-storage memory device embodied with executable instructions that, when executed by a processor, cause the processor to:
 identify a first display device and a second display device;
 identify a first application presenting first content on the identified first display device and a second application presenting second content on the identified second display device;
 retrieve a refresh rate for the first display device based on an optimal refresh rate for the first application when the first application is presenting the first content in full screen mode;
 determine a refresh rate for the second display device;
 determine the refresh rate for the first display device and the second display device as an optimal refresh rate for a prioritized one of the first application and the second application, when neither of the first application and the second application are presenting the first content or the second content, respectively, in full screen mode; and
 cause the first content to be refreshed on the first display device at the refresh rate for the first display device and the second content to be refreshed on the second display device at the refresh rate for the second display device.

18. The computer-storage memory device of claim 17, further embodied with instructions to determine the refresh rate of the second display device that, when executed by the processor, cause the processor to:
- identify an optimal refresh rate for the second content; and
- determine to refresh the second display device at the identified optimal refresh rate for the second display device.

19. The computer-storage memory device of claim 17, further embodied with instructions that, when executed by the processor, cause the processor to:
- identify a third application presenting third content on the identified second display device;
- identify a prioritized application of the second application and the third application; and
- determine the refresh rate for the second display device as an optimal refresh rate for the identified prioritized application.

20. The computer-storage memory device of claim 19, wherein identifying the prioritized application further comprises:
- determining the second application has a higher optimal refresh rate than the third application; and
- prioritizing the second application.

* * * * *

UNITED STATES PATENT AND TRADEMARK OFFICE
CERTIFICATE OF CORRECTION

| | | |
|---|---|---|
| PATENT NO. | : 11,842,669 B1 | Page 1 of 1 |
| APPLICATION NO. | : 17/855755 | |
| DATED | : December 12, 2023 | |
| INVENTOR(S) | : Michael Paul Erich Von Hippel et al. | |

It is certified that error appears in the above-identified patent and that said Letters Patent is hereby corrected as shown below:

On the Title Page

After (22) Filed: June 30, 2022 insert:
-- (65) Prior Publication Data
US 2024/0005838 A1 Jan. 4, 2024 --

Signed and Sealed this
Twenty-fourth Day of September, 2024

Katherine Kelly Vidal
*Director of the United States Patent and Trademark Office*